No. 816,643. PATENTED APR. 3, 1906.
S. W. CHILES.
STUFFING BOX FOR TRAVELING CABLES, RODS, &c.
APPLICATION FILED OCT. 14, 1905.

WITNESSES:
Charles Hanimann
P. M. Kelly

INVENTOR
Sinclair W. Chiles
BY

ATTORNEY

UNITED STATES PATENT OFFICE.

SINCLAIR W. CHILES, OF SOUTH BETHLEHEM, PENNSYLVANIA.

STUFFING-BOX FOR TRAVELING CABLES, RODS, &c.

No. 816,643.

Specification of Letters Patent.

Patented April 3, 1906.

Application filed October 14, 1905. Serial No. 282,728.

*To all whom it may concern:*

Be it known that I, SINCLAIR W. CHILES, of South Bethlehem, county of Northampton, and State of Pennsylvania, have invented an Improvement in Stuffing-Boxes for Traveling Cables, Rods, &c., of which the following is a specification.

My invention has reference to stuffing-boxes for traveling cables, rods, &c.; and it consists of certain improvements which are fully set forth in the following specification and shown in the accompanying drawings, which form a part thereof.

The object of my invention is to provide a stuffing-box through which a cable or rod having a helical surface may freely travel while maintaining a practically air and liquid tight condition.

My invention has particular use in connection with the cables used in caisson-work, and more particularly with the air-lock appliances thereof through which the cable and buckets pass; but I do not restrict the use of my invention to any special application in the arts, as there are numerous uses to which it may be applied.

My invention consists of a tubular box or frame, combined with an annular packing surrounding the cable and having its hole shaped to conform to the helical configuration of the surface of the cable, the said annular packing being free to rotate within the box or frame during the travel of the cable.

My invention also consists in forming the rotating annular packing of metal and having means for lubricating its hole and cable.

My invention further consists in providing antifriction-bearings at top and bottom of the annular packing and contained within the box or frame, whereby the packing is free to rotate when the cable is moved in either direction.

My improvements also embody details of construction, which, together with the features above specified, will be better understood by reference to the drawings, in which—

Figure 3:
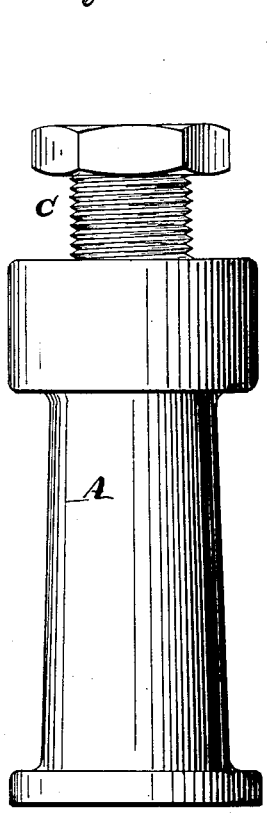
Figure 1:
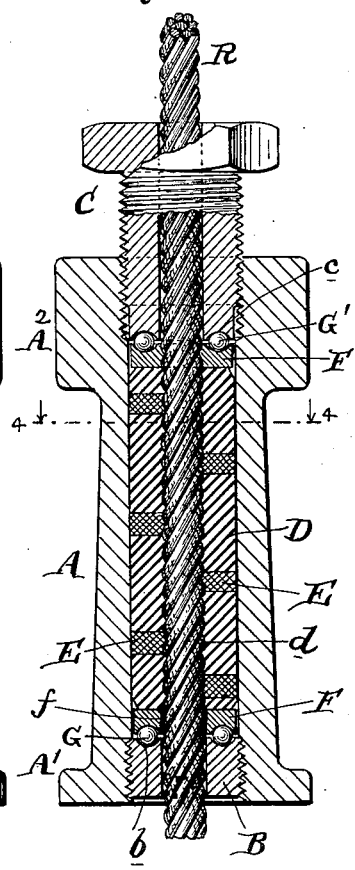
Figure 2:
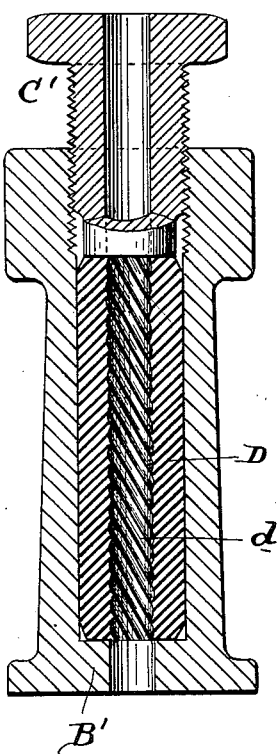
Figure 4:
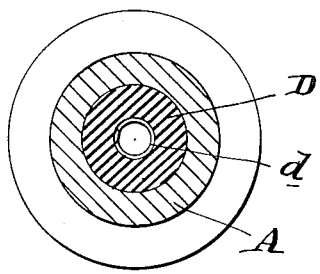
Figure 4:

Figure 1 is a sectional elevation of a stuffing-box embodying my invention. Fig. 2 is a sectional elevation of a modified form of my invention. Fig. 3 is an elevation of my improved stuffing-box, and Fig. 4 is a cross-section of the same on line 4 4 of Fig. 1.

A is the box or frame and may be made of any outward shape to suit the particular use to which it is to be put. As shown, this case is circular in its body, with flanges $A'$ $A^2$ at its ends. The interior of this box A is bored to a diameter considerably larger than the cable R, which travels through it. The lower end of the case is closed by an annular plug B of hardened steel screwed into it and having a circular groove $b$ in its upper surface in which are placed antifriction-balls G. Resting upon these balls is a hardened-steel ring F. Upon this steel ring F is arranged the tubular packing D, preferably of metal. Above this packing and resting upon it is a second hardened-steel ring $F'$, which supports a series of antifriction-balls $G'$, the upward thrust of which is received by the lower end of a steel gland C, having a groove $c$ receiving the balls and screwed into the upper end of the case A.

The parts F, D, and $F'$ should preferably closely fit the case so as to make a reasonably tight fit, but with freedom of rotation within the case as a journal-bearing.

The holes through the parts F D $F'$ should be bored with helical grooves to correspond to the helical ribs of the cable formed by the stands thereof, so that the travel of the cable will cause the packing D and the rings F $F'$ to rotate with a speed commensurate with that of the cable, while maintaining a comparatively tight fit between these parts and the cable. The holes in the plug B and the gland C are slightly larger than the cable, so that it can travel freely through them.

To properly lubricate the packing D, I provide it with transverse pockets filled with plumbago lubricant E, which not only lubricates the cable R, but also the interior surface of the case A. Any other means for lubricating may be employed in lieu of that shown.

While I prefer to make the holes in the rings F $F'$ with helical grooves, as above described, it is not necessary to so form them, as their frictional contact with the ends of the packing D would cause them to rotate upon the balls. It is also evident that these rings F $F'$ need not closely fit the interior of the case It will be further evident that these rings F $F'$ may be omitted altogether by allowing the balls G $G'$ to roll in contact with the ends of the packing D, in which case it should be made of hardened steel, or its ends, at least, should be hardened.

The gland C is screwed down sufficiently to keep the several parts in good operative relation and to take up all lost motion due to wear.

In the modified form of my invention shown in Fig. 2 the rings F F' and balls are dispensed with and the packing permitted to rotate against the gland C' directly and upon an inwardly-directed flange B' of the case at the bottom. This case A may be arranged in any position—permanent or movable—on the apparatus in which it is employed.

While I prefer the construction shown, I do not limit myself to the details, as they may be modified without departing from the spirit of the invention.

Having now described my invention, what I claim as new, and desire to secure by Letters Patent, is—

1. A stuffing-box for cables &c., consisting of a box or frame through which the cable travels, an annular packing journaled in the box or frame so as to rotate on an axis concentric with the cable and having its hole provided with helical grooves to engage the strands or ribs of the cable.

2. A stuffing-box for cables &c., consisting of a box or frame through which the cable travels, an annular packing journaled in the box or frame so as to rotate on an axis concentric with the cable and having its hole provided with helical grooves to engage the strands or ribs of the cable, and adjustable means carried by the box or frame for receiving the end thrust of the annular packing and compensate for wear.

3. A stuffing-box for cables &c., consisting of a box or frame through which the cable travels, an annular packing journaled in the box or frame so as to rotate on an axis concentric with the cable and having its hole provided with helical grooves to engage the strands or ribs of the cable, adjustable means carried by the box or frame for receiving the end thrust of the annular packing and compensate for wear, and antifriction-bearings between the annular packing and the means for taking the end thrust.

4. A stuffing-box for cables &c., consisting of a box or frame through which the cable travels, an annular packing journaled in the box or frame so as to rotate on an axis concentric with the cable and having its hole provided with helical grooves to engage the strands or ribs of the cable, adjustable means carried by the box or frame for receiving the end thrust of the annular packing and compensate for wear, and antifriction-bearings between the annular packing and the means for taking the end thrust consisting of rings resting against the ends of the annular packing and balls between the rings and the means for receiving the end thrust on the box or frame.

5. A stuffing-box for cables &c., consisting of a box or frame through which the cable travels, an annular packing journaled in the box or frame so as to rotate on an axis concentric with the cable and having its hole provided with helical grooves to engage the strands or ribs of the cable, adjustable means carried by the box or frame for receiving the end thrust of the annular packing and compensate for wear, and antifriction-bearings between the annular packing and the means for taking the end thrust consisting of rings resting against the ends of the annular packing and having their holes made with helical grooves corresponding to the helical ribs on the cable whereby they are rotated by the traveling cable at a speed equal to that of the packing, and balls between the rings and the means for receiving the end thrust on the box or frame.

6. A stuffing-box for cables &c., consisting of a box or frame through which the cable travels, an annular packing journaled in the box or frame so as to rotate on an axis concentric with the cable and having its hole provided with helical grooves to engage the strands or ribs of the cable and in which the packing is provided with pockets containing lubricant.

7. A stuffing-box for cables &c., consisting of a box or frame through which the cable travels, an annular packing journaled in the box or frame so as to rotate on an axis concentric with the cable and having its hole provided with helical grooves to engage the strands or ribs of the cable, and means to lubricate the cable in passing through the annular packing.

8. A stuffing-box for cables &c., consisting of a box or frame through which the cable travels, an annular packing journaled in the box or frame so as to rotate on an axis concentric with the cable and having its hole provided with helical grooves to engage the strands or ribs of the cable, antifriction-bearings arranged upon each end of the annular packing, and means to hold the antifriction-bearings upon the box or frame.

9. A stuffing-box for cables &c., consisting of a box or frame through which the cable travels, an annular packing journaled in the box or frame so as to rotate on an axis concentric with the cable and having its hole provided with helical grooves to engage the strands or ribs of the cable, antifriction-bearings arranged upon each end of the annular packing, means to hold the antifriction-bearings upon the box or frame, and means for adjusting the said bearings to take up the lost motion due to wear.

In testimony of which invention I hereunto set my hand.

SINCLAIR W. CHILES.

Witnesses:
CHARLES H. GROMAN,
M. P. CASHNER.